Figure 1:
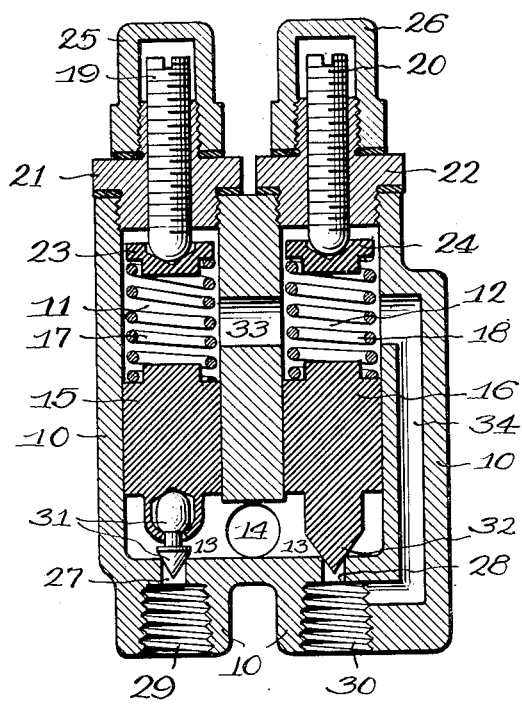

Sept. 18, 1934. W. T. BALL 1,974,296

DUPLEX PRESSURE REGULATING VALVE

Filed June 16, 1930

Inventor,
William T. Ball,

Witness:

Patented Sept. 18, 1934

1,974,296

UNITED STATES PATENT OFFICE 1,974,296

DUPLEX PRESSURE REGULATING VALVE

William Tyler Ball, Moline, Ill., assignor, by mesne assignments, to United Electric Controls Company, Boston, Mass., a corporation of Massachusetts Application June 16, 1930, Serial No. 461,412

1 Claim. (Cl. 137—153)

This invention relates to improvements in duplex pressure regulating valves, i. e. those used in conjunction with a pump for maintaining fluid pressure in a system between certain upper and lower limits.

Such valves are useful particularly as part of an oil burner equipment in which no oil is pumped to the burner until the pressure in the valve reaches a certain predetermined minimum. If, subsequently, the pressure increases above a predetermined maximum, the valve operates to permit some of the oil to flow through a by-pass around the pump or back to a storage reservoir.

It is an object of this invention to provide a compact, simple, effective valve which may be made at low cost which will deliver a fluid between adjustable fixed minimum and maximum pressures. Further objects will be apparent from the following description in connection with the appended drawing in which Fig. 1 shows a cross sectional elevation of one embodiment of the invention; and Fig. 2 shows a plan view thereof.

The valve shown consists of a cast body portion 10 having two open ended cylinders 11 and 12 therein. These cylinders terminate at the bottom in an inlet chamber 13, the fluid entering through either one of the two openings 14, the other inlet provided being used for a pressure gauge if desired, or else closed with a plug. In cylinders 11 and 12 are pistons 15 and 16 above which are coil springs 17 and 18. The compression of these springs is controlled by means of studs 19 and 20 threaded through the cylinder closure members 21 and 22 and which press against discs 23 and 24 seated in the ends of said springs. The other ends of the studs are enclosed by means of caps 25 and 26.

Opposite the front ends of the pistons 15 and 16 and alined therewith are outlet openings or valve seats 27 and 28 in the lower end of the valve. These outlets terminate in the threaded openings 29 and 30. The lower ends of the pistons carry valve members, preferably needle points, since a needle valve produces a sharp and consequently very desirable shut-off for oil flowing to oil burner nozzles. I have found it especially advantageous to have the valve needle attached to the piston by a ball and socket joint to secure perfect seating and prevent any leakage. Such a ball and socket needle is shown at 31. Any slight variations of alignment between the piston and the valve seat are taken care of by the ball and socket arrangement.

Figure 2:
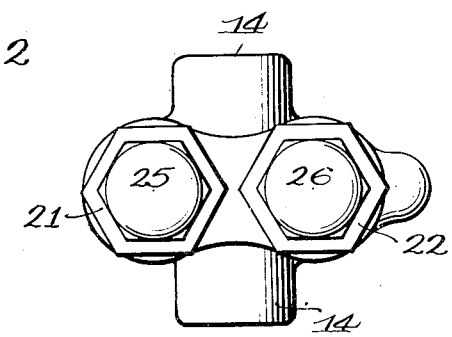

As viewed in Fig. 1, the left hand valve just described is the lower pressure or minimum pressure valve, the right hand side controlling the higher pressure or maximum pressure valve.

For the maximum pressure side it is not necessary to use a ball and socket valve since any liquid leakage merely returns to the storage system or to the suction side of the pump as later explained. A simple type of needle valve is used, therefore, made by finishing the piston 16 into a needle point 32 which seats in the outlet 28. Other types of valves may be used but that shown is preferable because of its ease of manufacture.

Any leakage of fluid past the pistons 15 and 16 into the spring chambers is drained back into the storage system by means of ducts 33, 34 and outlet 30.

The valve operates as follows: The oil or other fluid under pressure enters chamber 13 through opening 14 and the pressure builds up therein. The piston 15 is not lifted until the fluid pressure is great enough to overcome the pressure of spring 17 at which time the piston moves against the spring pressure, opening the needle valve 31 and allows the fluid to flow at the desired pressure through the outlet 29 to the point of consumption, such as an oil burner. This insures the oil reaching the burner nozzle at an atomizing pressure. An excess of oil must be pumped to ensure a continuous flow. To maintain the pressure at a predetermined maximum, the compression of spring 18 is set by means of screw stud 20 so that piston 16 will lift at the desired maximum pressure. Oil then passes out through outlet 30 and back to the storage reservoir or suction side of the pump in an amount sufficient to keep the pressure at the desired maximum.

Since there is necessarily a certain leakage past the pistons, it becomes necessary to drain this leakage to prevent accumulation of pressure back of the pistons, and for this purpose the two spring chambers 11 and 12 may be connected, as shown, by duct 33 and both connected to the duct 34 and outlet 30 so that the leakage past the pistons will drain back to storage or to the suction side of the pump.

A complete shut-off is important on the low pressure control side as oil leaking past the valve 31 would flow to the oil burner nozzles and drop therefrom with possible danger of an explosion under adverse conditions, whereas no danger follows the leakage past the high pressure valve 32. Since piston 15 controls the minimum pressure, the valve 31 opens at a lower fluid pressure in chamber 13 than does valve 32 controlled by piston 16. This regulation may be obtained by screwing studs 19 and 20 up or down to decrease or increase the spring pressures as desired.

The needle point 31 may be made of an acid resisting or corrosion resisting metal, i. e. a nickel chromium steel or other alloy, such as Illeum described and claimed in S. W. Parr Patent No. 1,115,239. This is desirable since oils may be corrosive due to acids which may be present in them.

Other types of valve construction may replace those shown as will be apparent to those skilled in the art. The studs 19 and 20 may be omitted making closure members 21 and 22 solid and bearing directly on the springs 17 and 18 and thus compression of these springs may be regulated by these closure members directly. In a further modification the springs may be mounted permanently abutting the pistons with the desired pressure, without the above adjustable features, the members 21 and 22 acting only as closures for the cylinders.

I claim:

A duplex fluid pressure regulating valve comprising, in combination, a body portion having two adjacent, parallel, open-ended cylinders therein terminating at the front end in a common fluid chamber, said fluid chamber having an inlet and two outlets for the fluid, said outlets being centrally opposite said cylinders, pistons slidable in said cylinders, one of which has a ball and socket joint at the front end thereof, coiled springs abutting against the rear of said pistons, closure members for the rear end of said cylinders having adjusting studs threaded therethrough pressing against said springs, a needle valve in the first of said outlets comprising a corrosion-resisting alloy valve needle mounted on said ball and socket joint and adapted to be seated in said first outlet centrally opposite the same, a needle valve in the second of said outlets comprising a needle point extension of the second piston adapted to be seated in the outlet centrally opposite the same, a duct connecting the spring chambers of both cylinders, a duct in said body portion connecting the spring chamber of said second cylinder with said second outlet beyond the needle valve seat, said first piston and spring being adapted to operate said first needle valve at a lower fluid pressure than said second piston and spring is adapted to operate said second needle valve.

WILLIAM TYLER BALL.